United States Patent [19]

Kang et al.

[11] 3,979,303

[45] Sept. 7, 1976

[54] OIL WELL DRILLING FLUID

[75] Inventors: Kenneth Suk Kang, La Jolla; William H. McNeely, San Diego, both of Calif.

[73] Assignee: Merck & Co., Inc., Rahway, N.J.

[22] Filed: Jan. 2, 1975

[21] Appl. No.: 538,232

Related U.S. Application Data

[63] Continuation-in-part of Ser. No. 435,145, Jan. 21, 1974, abandoned, which is a continuation of Ser. No. 228,868, Feb. 24, 1972, abandoned, which is a continuation-in-part of Ser. No. 854,322, Aug. 29, 1969, abandoned.

[52] U.S. Cl. ............................ 252/8.5 C; 195/31 P; 252/8.5 A; 252/8.5 P; 252/8.55 R; 252/316
[51] Int. Cl.$^2$ .......................................... C09K 7/02
[58] Field of Search ............ 195/31, 31 P; 260/209; 252/8.5 C, 8.5 P, 316, 8.55 R, 8.5 A

[56] References Cited
UNITED STATES PATENTS

| | | |
|---|---|---|
| 2,360,327 | 10/1944 | Bailey et al. ........................ 252/8.5 |
| 3,198,268 | 8/1965 | Lindblom et al. ................ 252/8.5 X |
| 3,243,000 | 3/1966 | Patton et al. ................... 252/8.5 X |
| 3,391,061 | 7/1968 | McNeely .............................. 195/31 |

OTHER PUBLICATIONS

Lopez et al., Chemical Abstracts, vol. 71, No. 57951f, 1969.

*Primary Examiner*—Herbert B. Guynn
*Attorney, Agent, or Firm*—Donald J. Perrella; Hesna J. Pfeiffer; J. Jerome Behan

[57] ABSTRACT

A drilling fluid containing a novel heteropolysaccharide, Heteropolysaccharide S-7. A method for the drilling of oil wells, gas wells and the like which involves the circulation of the above drilling fluid within the well bore.

11 Claims, No Drawings

OIL WELL DRILLING FLUID

RELATIONSHIP TO PRIOR APPLICATIONS

This application is a continuation-in-part of U.S. Ser. No. 435,145, filed Jan. 21, 1974, now abandoned, which in turn was a continuation of U.S. Serial No. 228,868, filed Feb. 24, 1972, now abandoned, which in turn was a continuation-in-part of U.S. Ser. No. 854,322, filed Aug. 29, 1969, now abandoned.

SUMMARY OF THE INVENTION

The present invention relates to a novel drilling fluid and to its use in the drilling of oil wells, gas wells and the like in which viscous fluids are circulated within the well bore.

Drilling muds which are used in the drilling of oil wells, gas wells and the like are generally aqueous fluids which contain substantial quantities of clays and other colloidal materials. These colloidal materials assist in imparting the desired viscosity and gel strength to the fluid as required for the entrainment and suspension of drill clays and weighting agents and in the formulation of filter cake as needed for the reduction of fluid losses to the surrounding strata. The viscosity provided in drilling fluids by the use of collodial clays and the like frequently can have an adverse effect in that the resulting fluids are difficult to pump and do not provide adequate lubrication of the drill bit. Thus, it would be desirable to provide drilling fluids which are more flexible in their viscosity characteristics so as to provide suspension of solids within the fluid as required for the filter cake without havinng an adverse effect upon the pumpability of the fluid and its ability to lubricate the drill bit.

In acccord with the present invention, we have provide a drilling fluid which contains a novel heteropolysaccharide, Heteropolysaccharide S-7, that imparts very desirable properties to the drilling fluid. In use, the heteropolysaccharide may be cross-linked by certain metal ions which may be present in the drilling fluid. It has been found that drilling fluids which contain our novel Heteropolyssaccharide S-7 are highly pseudoplastic such that they undergo a marked reduction in viscosity when subjected to shear forces. This permits the fluids to have a very high viscosity when at rest or when subjected to slight shear so as to entrain and suspend the drill clays and weighting agents present in the fluid. At the same time, when the drilling fluid is subjected to shear forces, as in pumping, the resulting viscosity is markedly decreased which provides for ease in pumping. Also, when the drilling fluid encounters the high shear forces generated by the drill bit, the fluid is greatly reduced in viscosity so as to provide improved lubrication of the drill bit.

Heteropolysaccharide S-7 is produced by inoculating a fermentation medium with a culture of the bacteria *Azotobacter indicus var. myxogenes* and incubating the fermentation medium at a temperature of about 25° to about 35°C. with agitation and aeration of the medium. The fermentation medium contains a carbohydrate source at a concentration of about 1 to about 5% by weight, a source of magnesium ions, a source of phosphorous, a source of nitrogen, and water; the fermentation is carried out until the residual sugar content in the fermentation medium is in the order of about 0.3% by weight or less.

The bacterium employed in the fermentation to produce Heteropolysaccharide S-7 is, to our knowledge, a new bacterium. A deposit of a strain of this bacterium was made in the American Type Culture Collection on August 19, 1969, and the accession number of the Deposit is 21423. At the time of deposit this organism was identified as *Azotobacter indicus* KSI-7.

The characteristics of the bacterium, as determined by very extensive testing, are summarized as follows:

Morphology:

a. Cells—Gram negative, non-acid fast, nonspore forming rod of $0.3–0.6 \times 0.5–1.2\mu$ in size. Bacteria is encapsulated and produces a large amount of extracellular slime. Organism is motile having lateral multitrichous flagella. In a nitrate broth organism shows an extensive chain formation up to around 15 bacilli per chain only during the logarithmic growth period. In the stationary growth period of the incubation time organism occurs mostly in an oviod to inflated rod shapes of $0.6–0.8 \times 1.2–1.6\mu$ in size with highly refractive bodies in the cells—usually one at each end. These bodies and cell wall component have a normal affinity to Safranine dye while the rest have very weak or no affinity at all. Consequently, organism exhibits a polar staining property on a gram stained slide. This characteristic also observed in the bacteria grown in Burk's medium.

b. Colony—The following colonial morphology is observed on the two different media.

YM plate: Shiny circular yellow colonies with a size of 2–4 mm. in diameter. Convex elevation with entire margin. Gummy colonies become a sticky waxy texture upon aging. Yellow pigment is not water soluble but soluble in alcohols. It exhibits a characteristic absorption spectrum (477:446:442 m$\mu$).

Burk's plate with glucose: Organism grows well developing into gummy colonies free of the yellow pigment. Colonies are almost transparent and circular with a size of 2–3 mm. in diameter, pulvinate elevation with entire margin. Poor growth encounter on the Burk's medium with mannitol as carbon source.

Growth Characteristics:

a. Nutrient broth—flocculent, slightly turbid with small amount of sediment. No odor or surface growth.

b. YM broth—flocculent, moderately turbid with scanty viscid sediment. No surface growth.

c. Nutrient agar slant--filiform growth.

d. YM agar slant—filiform growth.

e. Potato—good growth with yellow pigmentation and no darkening of potato.

f. Litmus milk—reduction of litmus, no clotting, no gas. Casein hydrolysis with clear upper layer.

g. Nitrogen source—good growth in shake flask with organic nitrogen source such as peptone, tryptone, and soy proteins. Poor growth with inorganic nitrogen such as ammonium sulfate or ammonium nitrate. The pigmentation is associated with nitrogen, particularly the inorganic source.

h. Growth temperature—grow at 20°–38°C. No growth at 40°C. The optimum temperature is around 30°C. Thermal death point is around 55°C.

i. Growth pH—grow in nutrient broth in the ph range of 4.5 to 8.7. The optimum ph is $7.0 \pm 0.5$.

j. Congo red absorption—colonies stained deep orange, more heavily grown area takes up less pigment, yellow-orange.

Salt Tolerance:

YM broth containing:

| | |
|---|---|
| 1.0% NaCl | no growth after 3 days incubation. |
| 1.5% NaCl | no growth after 6 days incubation. |

Antibiotic Sensitivity:

| | |
|---|---|
| Penicillin | not sensitive |
| Polymyxin B | not sensitive |
| Streptomycin | sensitive |
| Aueromycin | sensitive |
| Neomycin sulfate | not sensitive |
| Cyclohexamide | not sensitive |

Biochemical Characteristics:

| | |
|---|---|
| Methyl red | positive |
| Catalase | positive |
| Indol formation | negative |
| Urease | negative |
| Arginase | positive (5 days, aerobic) |
| Oxidase | positive |
| Amylase | negative |
| Cellulase | positive |
| Gelatin liquefaction | negative |
| Nitrate reduction | negative |
| H$_2$S formation | positive |
| Citrate utilization | negative |
| Acetylmethyl carbinol formation | negative |

Carbohydrate Utilization in Dye's Medium at 0.5% concentration of carbohydrate using Brom-Cresol Purple Good growth in one day to produce said pH:D-glucose, D-mannose, D-galactose, D-fructose; D-arabinose, D-xylose, D-sucrose, D-maltose, and D-cellobiose.

Fair growth in one day to produce acid pH using D-trehalose.

Poor growth in one day to produce alkaline pH:D-mannitol, i-inositol, and adonitol.

Good growth in three days to produce acid pH:D-lactose, D-raffinose, and salacin.

Fair growth in four days to produce acid pH using melibiose.

Fair growth in five days to produce weak acid pH:D-ribose, L-rhamnose, and dextrin.

Fair growth in either two or five days to produce essentially no change in pH using sodium alginate.

Effects of Amino Acids on Pigmentation:

No growth with glycine, alanine, serine, valine, histidine, lysine, methionine.

Very poor growth with phenylalanine and no pigmentation.

Growth with leucine, isoleucine, cystine, and hydroxyproline to give pale yellow pigmentation; with tyrosine and citruline to give yellow pigmentation; with aspartic acid, glutamic acid and arginine to give bright yellow pigmentation.

Heteropolysaccharide S-7 is produced by growing the Azotobacter indicus var. myxogenes organism in an aqueous nutrient medium at a temperature of from about 25°–35°C., and preferably at about 30°C. until substantial Heteropolysaccharide S-7 is elaborate. The fermentation time is normally from about 35–60 hours, and preferably from about 37–48 hours.

The aqueous nutrient medium, i.e., the fermentation medium, contains an appropriate source of carbon and nitrogen as well as a source of low levels of magnesium and phosphorus. The carbon source is a carbohydrate at a concentration of about 1 to 5% by weight, and preferably about 2 to 3% by weight. Suitable carbohydrates include, for example, dextrose, sucrose, maltose, fructose, mannose, starch hydrolysate or corn syrup. Preferably, the carbohydrate source employed is dextrose (glucose). Crude sugars may be used, such as deionized molasses, or a product such as Hydrol-E-081 manufactured by Corn Products Refining Company. Hydrol-E-081 is a mixture composed largely of dextrose and maltose and includes small amounts of oligosaccharides. A further ingredient which is present in the fermentation medium is a source of magnesium ions. The magnesium salt content of the fermentation medium is in the range of about 0.005 to about 0.02% by weight. The source of magnesium ions is not critical, and suitable sources include water soluble magnesium salts, such as magnesium sulfate heptahydrate, magnesium acetate, magnesium chloride, magnesium nitrate, and magnesium acid phosphate.

At least a trace quantity of phosphorus, generally in the form of a soluble potassium salt, is also present in the fermentation medium. Larger quantities of phosphorus, such as about 0.65% by weight of the fermentation medium, calculated as dipotassium-acid-phosphate, can, however, also be used without adverse effects.

A further ingredient which is present in the final fermentation medium is a source of nitrogen. The nitrogen source may be organic in nature as, for example, soy protein; an enzymatic digest of soybean meal such as Soy Peptone, Type-T: Promosoy 100; a pancreatic hydrolysate of casein, such as N-Z amine Type A; an enzymatic digest of proteins, such as Ferm Amine Type IV, or distillers solubles, such as Stimuflav. Soy protein is sold by Nutritional Biochemical Corp., Cleveland, Ohio; Promosoy 100 is sold by Central Soya Chemurgy Division; Stimuflav is marketed by Hiram Walker & Sons, Inc., and the other materials are sold by Sheffield Chemical, Norwich, New York. When utilizing an organic nitrogen source in the fermentation medium it may be present in an amount ranging between about 0.01 and about 0.07% by weight of the fermentation medium.

Also, it has been found desirable to have present in the fermentation medium an inorganic nitrogen source, such as ammonium nitrate, ammonium chloride, ammonium sulfate or ammonium acetate. The amount of ammonium salt which may be employed can range from about 0.02 to about 0.15% by weight and preferably from about 0.045 to about 0.1% by weight of the medium.

The pH of the fermentation medium is important for suitable growth of the bacteria and elaboration of Heteropolysaccharide S-7. We have found that the optimum starting pH for production of colloid is within the range of about 7 ± 0.5. Control of the pH within this range can generally be obtained by the use of a buffer compound such as dipotassium acid phosphate at a concentration from about 0.4 to about 0.6% by weight of the fermentation medium. Conversely, the pH can be controlled through conventional means by using a pH meter coupled with a source of a suitable base, such as a solution of potassium hydroxide. As the pH is lowered due to the production of acids during the fermentation reaction, small quantities of the potassium hydroxide solution may be automatically added by the pH controller to keep the pH within the desired range.

Typically, the bacterial fermentation process of our invention under the above conditions does not require the addition of alkali to neutralize the acid throughout the entire course of the fermentation. However, the pH of the fermentation liquor does drop gradually down to about 6.0 and this generally occurs during the latter part of the fermentation (for example, if the fermentation is allowed to exceed 40 to 45 hours). However, this is considered as normal. In the event, however, that the pH should drop below 6.0 after about 35 to 40 hours of incubation, this is an indication of an abnormal fermentation and, in this case, potassium hydroxide or another suitable base such as sodium hydroxide should be added so as to maintain a pH of at least about 6.5.

In order to obtain a rapid fermentation, we have found that it is essential to have a sufficient quantity of oxygen available for the grown *Azotobacter indicus var. myxogenes* culture. If either too much or too little oxygen is available, the production of Heteropolysaccharide S-7 by the bacterial culture is slowed down. Our process requires that sufficient oxygen be made available for the bacteria. The oxygen requirements can be defined in terms of a sulfite oxidation value, which is a measure of the rate of oxygen uptake in the fermentor under the agitation and aeration conditions employed. It is, however, preferred to describe this aspect of the process in terms of dissolved oxygen, and in this regard it is important that a dissolved oxygen level of 5–10% be maintained at least during the first 20–40 hours of the fermentation. Thus, the liquid medium should contain 5–10% of the amount of oxygen that can be dissolved in the medium, when the oxygen, is added as air.

The course of the fermentation to produce our novel heteropolysaccharide may be followed by determining the residual sugar content of the fermentation medium. For best results, the fermentation is continued until the residual sugar content of the medium is in the order of about 0.3% by weight, and preferably in the order of about 0.1% by weight or less.

When the fermentation is completed, our novel Heteropolysaccharide S-7 may be recovered from the fermentation liquor by known techniques, and preferably by solvent precipitation. Thus, the fermentation beer is treated with a water miscible solvent which does not react with the heteropolysaccharide and in which the product is only slightly soluble. The product is thus precipitated and may be recovered by accepted and known techniques, and dried. Typical organic solvents which may be used for this purpose are straight or branched chain lower alkanols, i.e. methanol, ethanol, isopropanol, butanol, t-butanol, isobutanol, n-amyl alcohol of which isopropanol is the preferred alcohol; lower alkyl ketones, such as acetone, may be employed. In some cases the precipitation is improved if the fermentation medium is first heated to a temperature of about 70°–90°C. for a short period of time and then cooled to about room temperature before addition of the solvent.

The novel Heteropolysaccharide S-7 as obtained as described above is a high molecular weight polysaccharide that functions as a hydrophilic colloid to thicken, suspend and stabilize water based systems. It is slightly soluble in lower alkanols and acetone. The carbohydrate portion of the molecule consists of about 73% of glucose, about 16% of rhamnose and about 11% of a uronic acid (all by weight). Thus, the glucose, rhamnose, uronic ratio may be expressed as 6.6:1.5:1.0. It has an acetyl content of about 8.0–10.0%.

A detailed description of our *Azotobacter indicus var. myxogenes*, of the method of growing it to produce Heteropolysaccharide S-7 and of the novel heteropolysaccharide itself is not a part of this invention, but is claimed in our copending application Ser. No. 403,748, filed Oct. 5, 1973, now U.S. Pat. No. 3,915,800. Said Ser. No. 403,748 is a continuation-in-part of copending application Ser. No. 239,819, now abandoned, which is in turn a continuation of Ser. No. 854,322, filed Aug. 29, 1969 and now abandoned.

As described previously, the drilling muds of our invention are prepared by the addition of the above described Heteropolysaccharide S-7 to an aqueous drilling fluid. The Heteropolysaccharide S-7 may be cross-linked in the aqueous fluid by the addition thereto of polyvalent metal cations selected from Groups II through VIII of the Periodic Table. Preferred cross-linking agents are water soluble trivalent chromium compounds such as chromium sulfate, chromium chloride, chromium potassium sulfate, etc. Also, however, the heteropolysaccharide may be cross-linked with water soluble compounds of other metals which yield polyvalent metal cations in aqueous solution. For example, aluminum chloride, maganese dichloride, ferric chloride, calcium chloride, or magnesium aluminum silicate may be employed.

In cross-linking the heteropolysaccharide, the Heteropolysaccharide S-7 may first be added to an aqueous medium to form a solution. Following this, the water-soluble cross-linking agent is added to the solution. The heteropolysaccharide may be present at a concentration of about 0.05% to about 2.5% by weight or higher. The water-soluble cross-linking agent, as above described, is generally present at a concentration of about 5 to about 100% by weight of the heteropolysaccharide sufficient to cross-link the heteropolysaccharide to the desired extent.

Reaction between the heteropolysaccharide and the polyvalent cations provided by the cross-linking agent is generally conducted at ambient temperature and at a basic pH. During the addition of a base in the formulation of a cross-linked drilling mud, the base is added generally with stirring to the mixture of the heteropolysaccharide and cross-linking agent. If the base is added too rapidly, it may cause a high localized basicity which can cause precipitation or gelation of the heteropolysaccharide. The cross-linking may be carried out in either fresh water or brine and is accompanied by a substantial increase in viscosity and can result in the formation of a gel. The degree of increase in the viscosity is affected by the amount of the cross-linking agent present, the time interval over which the various ingredients are added, the degree of mixing employed, the pH of the solution, the salinity of the solvent water and its temperature, etc. Preferably, the heteropolysaccharide is first added to water with agitation sufficient to form a homogenous solution. Following this, the cross-linking agent is then added and permitted to dissolve. If desired, the order of addition can be reversed with the cross-linking agent added first followed by addition of the heteropolysaccharide. Thereafter, the base is added in a sufficient amount to raise the pH to about 7.5 to about 11. When employing a cross-linking agent containing chromium, as discussed above, the pH is preferably between about 8.5 and 10.5. During the addition of the base to the cross-linking agent, the solution is agitated to obtain uniform mixing. As aforestated, the base should be added gradually to avoid the precipitation or gelation of the heteropolysaccharide. A further reason for adding the base gradually is to avoid precipitation of the cross-linking agent.

Solutions containing our novel heteropolysaccharide, which may be cross-linked in the above manner, if desired, may be employed as a drilling mud or fracturing fluid without the addition of other materials. Thus, for example, in drilling a formation which contains clay-type shales which would serve to increase the density of the drilling fluid, the drilling fluid may be a simple solution of the heteropolysaccharide in water. During drilling, the drill clays from the formation would then be picked up by the drilling fluid to increase its density.

In some cases, a weighting agent may be included in the drilling fluid. Typical of such weighting agents are barium sulfate, amorphous silica or calcium carbonate, lead sulfide, barium carbonate and the like. Also included in the drilling fluid is a preservative such as formaldehyde, paraformaldehyde, or sodium trichlorophenate, sodium pentachlorophenate and the like. The weighting agents are employed at a concentration which will provide the desired mud density and the preservatives are generally employed at a concentration of about 0.001% to about 0.1% based on the weight of the fluids in the system.

Other additives, in addition to the weighting agents and preservatives, may also be present in the muds or similar fluids of our invention. As an example, the drilling fluid may also include gel forming materials such as bentonite and attapulgite clay and fluid loss agents, such as starch and carboxymethyl cellulose. Still other types of additives which may be present are viscosity modifying agents such as ferro chrome lignosulfonate, sodium lignosulfonate, quebracho, and calcium lignosulfonate; calcium treating agents such as lime, calcium sulfate and calcium chloride; emulsifiers such as petroleum sulfonate, tall oil soap and sodium lignosulfonate and materials such as crude oil or diesel oil if an emulsion fluid is desired. The above listed additives will not normally all be present in a particular drilling mud or other fluid and the quantity of a particular additive will be determined to some extent by the other constituents of the fluid and the particular use intended for the fluid.

In selecting an additive for use in a particular mud or fluid, caution should be exercised to avoid using a material which might have a detrimental effect upon the heteropolysaccharide, such as a quaternary ammonium compound. The use of the various additives as set forth above, in a particular drilling mud or fluid of our invention will also be governed to some extent by the viscosity and fluid loss properties desired in the fluid. If a lignosulfonate is employed as an additive in a drilling fluid of our invention in which the heteropolysaccharide is cross-linked reaction has occurred since lignosulfonates are sequestering agents which would have a tendency to tie up the chromium ions and thereby interfere with the cross-linking reaction.

Lignosulfonates can be used to reduce fluid loss and the use of oil, either alone or in combination with lignosulfonates, lignites or quebracho is also quite effective. Small quantities of clay, such as bentonite or attapulgite clay may also be added to further improve the fluid loss value by formation of filter cake.

Our novel Heteropolysaccharide S-7, either alone or cross-linked, as described above, may be also used in emulsion-type drilling fluids. The addition of the heteropolysaccharide and optionally the cross-linking agent and the base to water followed by intense mixing of the resultant solution with oil will result in a stable oil-in-water emulsion. Oil-in-water emulsions have low fluid loss properties and also have the desirable characteristics which are typical of emulsion-type drilling fluids.

To further illustrate our invention, there are presented the following examples in which all parts and percentages are by weight, unless otherwise stated.

EXAMPLE 1

To demonstrate the relationship between the concentration of our Heteropolysaccharide S-7 and the viscosity which it produces in an aqueous fluid, aqueous solutions were prepared which contained varying quantities of our heteropolysaccharide. The viscosities of these solutions in centipoises were then determined at 25°C. at various shear rates utilizing a Brookfield Synchro-lectric Viscometer, Model LVF, with a number 4 spindle and at speeds of 60, 12 and 6 r.p.m. These data are shown in the following table:

TABLE I

| Conc. of Polysaccharide S-7 (grams/100 mls.) | Apparent Viscosity (cps) | | |
|---|---|---|---|
| | 60 r.p.m. | 12 r.p.m. | 6 r.p.m. |
| 0.2 | 180 | 250 | 450 |
| 0.5 | 750 | 2,250 | 3,900 |
| 0.8 | 1,360 | 5,750 | 10,200 |
| 1.0 | 1,950 | 7,500 | 14,200 |
| 1.3 | 2,500 | 10,600 | 20,000 |
| 1.5 | 3,500 | 13,000 | 24,900 |
| 2.0 | 5,000 | 16,500 | 34,000 |

As demonstrated in the above table, the aqueous solutions containing our heteropolysaccharide were highly pseudoplastic. This is demonstrated by the fact that under the higher shear rate imposed by a spindle speed of 60 r.p.m., the observed viscosities were considerably lower than those observed at a spindle speed of 12 r.p.m. Similarly, the observed viscosities at 12 r.p.m. were considerably lower than those at 6 r.p.m.

EXAMPLE 2

To demonstrate the effect of temperature on fluids of our invention, an aqueous solution containing 1% by weight of our Heteropolysaccharide S-7 was made up and its viscosity was then measured at varying temperatures ranging from 4°C. to 90°C. The viscosity readings were taken with a Brookfield Synchro-lectric Viscometer, Model LVF using a number 4 spindle at 60 r.p.m. and these data are shown in the following table:

TABLE II

| Temperature °C | Apparent Viscosity (cps)* |
|---|---|
| 5 | 1900 |
| 10 | 1950 |
| 15 | 2000 |
| 20 | 1950 |
| 25 | 1950 |
| 30 | 1950 |
| 40 | 1900 |

TABLE II-continued

| Temperature °C | Apparent Viscosity (cps)* |
|---|---|
| 50 | 1900 |
| 60 | 1950 |
| 68 | 1850 |
| 79 | 2000 |
| 85 | 1850 |

*Average value from these readings

As demonstrated by the above data, the viscosities of aqueous fluids of our invention are surprisingly stable with respect to change in temperature. This is a necessary property since drilling muds and fluids are subjected to elevated temperatures in the well bore.

EXAMPLE 3

Aqueous fluids were made up which contained one percent by weight of our Heteropolysaccharide S-7 in distilled water. The pH of the fluids was varied by the addition of either 5.9 Normal hydrochloric acid or 11.7 Normal potassium hydroxide. The viscosities of the various fluids were then measured utilizing a Brookfield Synchro-lectric Viscometer, Model LVF, using a number 4 spindle at 60 r.p.m. and a temperature of 25°C. as shown in the following table:

TABLE III

| pH | Apparent Viscosity (cps) |
|---|---|
| 1.12 | 1100 |
| 1.28 | 1125 |
| 1.45 | 1175 |
| 1.70 | 1400 |
| 1.85 | 1700 |
| 1.90 | 1750 |
| 2.55 | 2250 |
| 2.70 | 2250 |
| 3.55 | 2200 |
| 5.2 | 2200 |
| 6.7 | 2000 |
| 7.88 | 2100 |
| 10.70 | 2100 |
| 11.25 | 2100 |
| 11.48 | 2175 |
| 11.75 | 2350 |
| 12.0 | 2400 |
| 12.25 | 2475 |
| 12.38 | 2500 |
| 12.60 | 2600 |
| 12.80 | 500 |

As illustrated by the above data, our fluids have outstanding stability over a wide pH range from about 2 to 12. In use as a drilling fluid, our fluids come into contact with various underground formations which affect the pH of the fluid. It is, therefore, essential that the fluid be stable over a wide pH range.

EXAMPLE 4

A number of our fluids were made up which contained 1% by weight of our Heteropolysaccharide S-7 in distilled water. Following this, the various fluids were each tested by the incremental addition of salts. At each of the salt concentration levels, the viscosity of the fluid was measured using a Brookfield Synchro-lectric Viscometer, Model LVF, employing a number 4 spindle at 60 r.p.m. and a temperature of 25°C. In obtaining the data in the following table, there was a time lapse of approximately 30 minutes between each of the measured viscosities for a particular salt since this much time was required to incrementally increase the salt concentration to the level required for the next viscosity measurement.

TABLE IV

| Concentration of salt (%) | APPARENT VISCOSITY (cps) | | | | | | | |
|---|---|---|---|---|---|---|---|---|
| | NaCl | KCl | CaCl$_2$ | (NH$_4$)$_2$SO$_4$ | MgSO$_4$ | ZnSO$_4$ | Cr(NO$_3$)$_3$ | Al(NO$_3$)$_3$ |
| 0.0 | 2050 | 2050 | 2050 | 2050 | 2000 | 2000 | 2050 | 2050 |
| 0.3 | 2450 | 2400 | 2500 | 2250 | 2400 | 2450 | 2475 | 2450 |
| 0.5 | 2550 | 2425 | 2525 | 2300 | 2425 | 2450 | 2425 | 2500 |
| 1.0 | 2550 | 2500 | 2550 | 2350 | 2425 | 2450 | 2450 | 2525 |
| 1.5 | 2550 | 2500 | 2550 | 2400 | 2425 | 2450 | 2475 | 2575 |
| 2.0 | 2550 | 2450 | 2550 | 2425 | 2425 | 2450 | 2450 | 2600 |
| 2.5 | 2600 | 2500 | 2550 | 2475 | 2425 | 2450 | 2450 | 2650 |
| 3.0 | 2650 | 2475 | 2525 | 2500 | 2425 | 2450 | 2475 | 2650 |

As demonstrated by the above data, the viscosity of each of the fluids increased initially on the addition of a given salt up to the point where the salt had a concentration of 0.3% by weight. At salt concentration above 0.3% by weight, the viscosities did not increase significantly in response to an increase in the salt concentration. In use, our fluids may encounter a variety of salts in a formation. Thus, it is quite important that the viscosity of the fluid not change appreciably through contact with salts in the formation. If, for example, salts caused an appreciable change in the viscosity of our fluids, it would be very difficult to predict the performance of the drilling fluid since its viscosity could change markedly from its original value due to salts in the formation.

EXAMPLE 5

The rheology of a fluid containing one percent by weight of our heteropolysaccharide in distilled water was studied over a wide range of applied shear forces. This data is set forth in the following table in which the measured viscosity was determined with a Brookfield Synchro-lectric Viscometer, Model LVF, using a Number 3 spindle at a temperature of 25°C.

TABLE V

| Shear Rate (r.p.m.) | Apparent Viscosity (cps) |
|---|---|
| 0.3 | 144,800 |
| 0.6 | 82,500 |
| 1.5 | 42,880 |
| 3.0 | 24,800 |
| 6.0 | 13,600 |
| 12.0 | 7,300 |
| 30.0 | 3,250 |
| 60.0 | 1,900 |

During the test, the shear rate was varied by varying the speed of rotation of the viscometer spindle which is shown above in revolutions per minute. The test data confirmed that our water base drilling fluids are highly pseudoplastic in their rheology. This is quite an advantageous property since our drilling fluids consequently have a high viscosity at rest or near rest and an ability to suspend solids that are contained therein. However, our fluids are also readily pumped since their viscosity drops immediately when they encounter the high shear forces imparted by the pump impeller and they also undergo a sharp drop in viscosity when they encounter the high shear forces generated at the drill bit.

EXAMPLE 6

In further tests, our fluids were made up and then subjected to a high pH in the order of about 10.5 to about 11 coupled with a water soluble cross-linking agent containing a polyvalent metal cation of Groups II - VIII of the Periodic Table. The viscosities of the fluids were then measured with a Brookfield Viscometer, Model LVF, at 60 r.p.m. using a Number 3 spindle at about 25°C.

TABLE VI

| | Apparent Viscosity (cps) | | |
|---|---|---|---|
| | Original | After salt addition | at high pH of about 10.5 to 11 |
| 0.3% by wt. of Polysaccharide 0.3% by wt. of $CrCl_3$ | 290 | 330(pH-4.0) | 440 (gel) |
| 0.5% by wt. of Polysaccharide 0.2% by wt. of $CaCl_2$ | 950 | 1100(pH-6.3) | gel |
| 0.2% by wt. of Polysaccharide 0.1% by wt. of $CaCl_2$ | 160 | 180(pH-6.5) | 360 (gel) |

As demonstrated in the above table, the effect of the polyvalent metal cation in conjunction with the high pH of 10.5 to 11 caused the formation of a gel through cross-linking of our heteropolysaccharide. The original viscosities shown in the table are for the fluids prior to addition of the cross-linking agents. The viscosities are then shown after addition of the crosslinking agent and still further after addition of a 5% aqueous solution of NaOH to increase the pH. On addition of the cross-linking agents, there was an increase in the viscosities of the fluids to a pH as shown in the Table. As the basicity of the fluids was increased by the gradual addition of NaOH with stirring, each of our fluids formed a pseudoplastic gel which was, however, still pumpable by the application of shear forces thereto.

EXAMPLE 7

In still further experiments fluids were made up by dissolving one gram portions of our heteropolysaccharide in 350 milliliters of either tap water, sea water or saturated brine from the Permian Basin in West Texas. Following addition of the heteropolysaccharide, the apparent viscosity, the plastic viscosity, and the yield point of the fluids were determined at about 25°C. using a Fann V-G Meter, Model 35. Following this, 0.3 grams of $CrCl_3 \cdot 3H_2O$ was added to each of the fluids before the pH was adjusted to 9.0–9.5. Following this, the apparent viscosity, the plastic viscosity and the yield point of each of the fluids was again determined with a Fann V-G Meter.

TABLE VII

| Rheological readings | Before Cr+++ addition | pH | After Cr+++ addition | pH |
|---|---|---|---|---|
| With tap water: | | | | |
| Apparent viscosity (cps) | 10.7 | | 40.7 | |
| Plastic viscosity (cps) | 6.0 | 6.9 | 24.0 | 9.0–9.5 |

TABLE VII-continued

| Rheological readings | Before Cr+++ addition | pH | After Cr+++ addition | pH |
|---|---|---|---|---|
| Yield point (lb/100 ft.²) | 9.4 | | 33.4 | |
| With sea water: | | | | |
| Apparent viscosity (cps) | 9.5 | | 16.6 | |
| Plastic viscosity (cps) | 5.0 | 7.5 | 10.6 | 9.0–9.5 |
| Yield point (lb/100 ft.²) | 9.0 | | 12.0 | |
| With brine water: | | | | |
| Apparent viscosity (cps) | 11.4 | | 19.1 | |
| Plastic viscosity (cps) | 7.0 | 6.8 | 12.8 | 9.0–9.5 |
| Yield point (lb/100 ft.²) | 8.8 | | 12.6 | |

The apparent viscosity (AV) in centipoises, as shown in the above table, is measured at a shear rate of 1022 reciprocal seconds and the plastic viscosity (PV) in centipoises is equal to twice the apparent viscosity minus the viscosity measured at a shear rate of 511 reciprocal seconds. For Newtonian fluids, the plastic viscosity and the apparent viscosity are the same. For pseudoplastic liquids, however, the plastic viscosity is less than the apparent viscosity. The yield point (YP) of the liquid is the theoretical force necessary to shear a fluid if it behaves as a Bingham plastic and is determined from the equation (YP=2AV-2PV). The values of the yield point, as shown in the above table, are expressed in pounds per 100 square feet.

As shown in the above table, all of the fluids were pseudoplastic since their plastic viscosities were considerably less than their apparent viscosities. Further, the data demonstrates that the presence of a polyvalent metal ion in conjunction with a base caused a significant increase in the apparent viscosity, the plastic viscosity and the yield point of the liquid through cross-linking of the heteropolysaccharide.

The weight ratio of the cross-linking agent, as described previously, with respect to the heteropolysaccharide in our drilling fluids may range from about 0.02/1 up to about 0.6/1 and higher up to 1/1 and our drilling fluids which contain such a mixture effectively thicken the fluid to the desired mixture.

In certain of our fluids, it may be desirable that the fluid be gelled. In these use applications, the pH of the aqueous media is adjusted to about 7.5 or 8 to about 11 in the presence of a cross-linking agent as described previously. In forming a gelled fluid, the weight ratio of the cross-linking agent to the heteropolysaccharide is within the range from about 1/5 to about 1/1 or up to 2/1 while the total concentration of the mixture of cross-linking agent and polysaccharide in the aqueous medium effectively forms a gel at a pH of about 8 to about 11.

EXAMPLE 8

An aqueous drilling fluid was made up which contained our heteropolysaccharide at a concentration of one pound per barrel (0.28% by weight). The viscosity of the fluid was measured at varying shear rates as set forth in the following:

TABLE VIII

| Shear Rate (Sec⁻¹) | Apparent Viscosity (cps) |
|---|---|
| 5.1 | 600 |
| 10.2 | 300 |
| 16.2 | 167 |
| 170 | 33 |
| 177 | 29 |
| 341 | 21 |
| 511 | 16 |

TABLE VIII-continued

| Shear Rate (Sec$^{-1}$) | Apparent Viscosity (cps) |
| --- | --- |
| 557 | 13.5 |
| 1,022 | 10 |
| 3,603 | 3.8 |
| 3,894 | 3.9 |
| 12,189 | 2.5 |
| 13,574 | 2.3 |
| 16,548 | 2.3 |
| 24,378 | 2.1 |
| 40,116 | 1.6 |
| 46,638 | 1.7 |
| 59,358 | 1.54 |
| 72,076 | 1.56 |
| 78,436 | 1.52 |
| 93,275 | 1.44 |

As demonstrated in the above table, the viscosity of our drilling fluids in directly related to the applied shear rate and ranged from a high of 600 cps at a shear rate of 5.1 reciprocal seconds to 1.44 cps at a shear rate of 93,275 reciprocal seconds. This tremendous variation in viscosity with respect to shear rate makes our fluids extremely versatile.

EXAMPLE 9

Various fluids were made up which contained 0.5% by weight of our heteropolysaccharide in water of varying hardness and salt content. The viscosities of the various fluids were determined using a Brookfield Viscometer, Model LVF, with a Number 4 spindle at 25°C. and a spindle speed of 60 r.p.m.

| | |
| --- | --- |
| Distilled water | 690 cps. |
| Tap water | 820 cps. |
| Sea water | 860 cps. |
| Permian Brine | 720 cps. |

As demonstrated by the above table, our drilling fluids are compatible with any type of water which may be encountered in the drilling of a well. The tap water was San Diego tap water having a hardness of 350 ppm. Sea water has a content of NaCl of about 35%, while Permian Brine has a salt content of about 26%. This is quite advantageous since the water used in the drilling fluid may frequently contain salt, as in the use of sea water in offshore drilling or in the use of brine water when drilling in the Permian Basin in West Texas.

EXAMPLE 10

A number of fluids were made up each of which contained one pound of our heteropolysaccharide per barrel of solvent. The solvents used were tap water and Permian Brine having the characteristics set forth in Example 9. The heteropolysaccharide was first added to the water and placed in solution by agitation with a Hamilton Beach High Shear Mixer. Following this, cross-linking agents were added and placed in solution with agitation and the pH of the solution was then adjusted by the addition of a 4% by wt. NaOH solution. After the cross-linking had occurred, the apparent viscosity, plastic viscosity, and the yield point of the fluids were determined using a Fann V-G Meter as described in Example 8.

TABLE IX

| | SOLVENT | Cross-Linking Agent (lbs/barrel) | pH | Apparent Viscosity (cps) | Plastic Viscosity (cps) | Yield Point (lb/100 ft.$^2$) |
| --- | --- | --- | --- | --- | --- | --- |
| (A) | Tap Water | | 8.5 | 8.5 | 3.0 | 11.0 |
| (B) | | PCA—0.3 | 10.2 | 29.5 | 14.0 | 31.0 |
| (A) | Tap Water | | 7.9 | 9.0 | 4.0 | 10.0 |
| (B) | | PCA—0.3 | 9.0 | 17.0 | 8.0 | 18.0 |
| (A) | Tap Water | | 8.0 | 9.0 | 4.0 | 10.0 |
| (B) | | Basic CrCl$_3$—0.3 | 9.2 | 15.0 | 6.0 | 18.0 |
| (A) | Permian Brine | | 7.5 | 10.5 | 6.0 | 9.0 |
| (B) | 5 drops of Octyl Alcohol | PCA—0.3 | 9.1 | 12.5 | 8.0 | 9.0 |
| (A) | Permian Brine | | 7.1 | 11.0 | 5.0 | 12.0 |
| (B) | 5 drops Octyl Alcohol | Basic CrCl$_3$—0.3 | 9.0 | 11.5 | 7.0 | 9.0 |
| (C) | | | 8.7 | 14.0 | 7.0 | 12.0 |
| (A) | Permian Brine | | 7.2 | 12.0 | 6.0 | 12.0 |
| (B) | 5 drops Octyl Alcohol | PCA—0.3 | 9.3 | 10.5 | 7.0 | 7.0 |
| (C) | | | 8.8 | 13.0 | 10.0 | 7.0 |
| (A) | Permian Brine | | 7.0 | 12.5 | 7.0 | 11.0 |
| (B) | 5 drops Octyl Alcohol | PCA—0.6 | 9.1 | 22.0 | 14.0 | 16.0 |
| (A) | Permian Brine | | 6.9 | 17.0 | 10.0 | 14.0 |
| (B) | 5 drops defoamer* | Basic CrCl$_3$—0.6 | 9.0 | 15.0 | 11.0 | 8.0 |
| (C) | | | — | 17.5 | 10.0 | 15.0 |

In the data shown in the above table, PCA denotes potassium chrome alum having the formula $K_2SO_4 \cdot Cr_2(SO_4)_3 \cdot 24H_2O$ which was purchased from Diamond Shamrock Corporation. The material denoted basic CrCl$_3$ has the formula $Cr_5(OH)_6Cl_9 \cdot 12H_2O$ and was also supplied by Diamond Shamrock Corporation.

In performing the experiments described in the table, the pH, apparent viscosity, plastic viscosity and yield point were first determined for the polysaccharide solution in the solvent. These determinations are denoted by the letter A in the first column of the table. Following this, the cross-linking agents were added and the pH was adjusted by the addition of NaOH. The pH, apparent viscosity, plastic viscosity and yield point were then determined for the cross-linked fluids and these determinations are denoted by the letter B in the first column. Either octyl alcohol or a defoamer were added in some instances to reduce foaming of the fluids during the addition of the cross linker. When used, the defoaming agent was added prior to the addition of the cross-linking agent. The defoamer identified by the asterisk in column 1 is obtainable as DF-100 from Fred Arrington and Associates and is believed to contain an appreciable quantity of octyl alcohol.

In some instances, further measurements were taken by subjecting the cross-linked fluid to slow stirring for 75 minutes followed by standing for 15 minutes. The pH, apparent viscosity, plastic viscosity and yield point were then determined and those determinations are denoted by the letter C in column 1.

As demonstrated by the above data, either basic chromium chloride or potassium chromium alum was quite effective in producing a cross-linked drilling fluid containing our heteropolysaccharide. Both the cross-linked and uncross-linked fluids had pseudoplastic viscosity characteristics in that their plastic viscosities were considerably lower then their apparent viscosities. Moreover, the yield points for the fluids were reasonably high which demonstrates that the fluids have a good carrying capacity for drill cuttings.

As demonstrated in the foregoing specification, our invention provides novel drilling fluids having unusual and advantageous properties and a method for their use in the drilling of wells. Our fluids have pseudoplastic viscosity characteristics such that they have a very high viscosity at rest or near rest and a relatively low viscosity under shear. Thus, the fluids may be readily pumped. However, due to the high viscosity of the fluids when at rest or near rest, they are able to suspend cuttings when the circulation of the drilling fluid ceases — as, for example, due to a breakdown in a pump used to circulate the drilling fluid.

Having described the invention, what is claimed is:

1. A water base drilling fluid comprising water and about 0.05 to about 2.25% by weight of the Heteropolysaccharide S-7 said Heteropolysaccharide S-7 having an acetyl content of about 8–10% by weight and the carbohydrate portion thereof consisting of, by weight, about 73% glucose, about 16% rhamnose, and about 11% of a uronic acid, said Heteropolysaccharide S-7 being soluble in water.

2. The drilling fluid of claim 1 wherein said water is a brine.

3. The drilling fluid of claim 1 containing oil.

4. The drilling fluid of claim 1 containing a cross-linking agent at a concentration of about 50 to about 100 percent by weight of said Heteropolysaccharide S-7, said cross-linking agent comprising a water soluble salt, the cation of which is chromium, zinc, sodium, potassium, calcium, ammonium, magnesium, aluminum, manganese, iron, or magnesium aluminum, and a base in an amount sufficient to raise the pH of said fluid to about 7.5 to about 11.

5. The drilling fluid of claim 4 wherein said water is a brine.

6. The drilling fluid of claim 4 wherein said pH is about 8.5 to about 10.5.

7. The drilling fluid of claim 1 containing a cross-linking agent at a weight ratio of cross-linking agent to Heteropolysaccharide S-7 of about 1/5 to about 2/1 with the total concentration of said cross-linking agent and said Heteropolysaccharide S-7 being sufficient to form a gel at a pH of about 8 to about 11, said cross-linking agent comprising a water soluble salt, the cation of which is chromium, zinc, sodium, potassium, calcium, ammonium, magnesium, aluminum, manganese, iron, or magnesium aluminum.

8. A method for drilling a well, said method comprising injecting the drilling fluid defined in claim 1 into a borehole, and circulating said fluid while drilling within said borehole in contact with a drill bit and the underground formation.

9. A method for drilling a well, said method comprising injecting the drilling fluid defined in claim 4 into a borehole, and circulating said fluid while drilling within said borehole in contact with a drill bit and the underground formation.

10. A method for drilling a well, said method comprising injecting the drilling fluid defined in claim 6 into a borehole, and circulating said fluid while drilling within said borehole in contact with a drill bit and the underground formation.

11. A method for drilling a well, said method comprising injecting the drilling fluid defined in claim 7 into a borehole, and circulating said fluid while drilling within said borehole in contact with a drill bit and the underground formation.

* * * * *